United States Patent Office.

PIERRE B. MOUGEOT, OF PARIS, FRANCE.

*Letters Patent No. 64,555, dated May 7, 1867.*

IMPROVEMENT IN THE MANUFACTURE OF SOAP.

*The Schedule referred to in these Letters Patent and making part of the same.*

TO ALL WHOM IT MAY CONCERN:

Be it known that I, PIERRE BONAVENTURE MOUGEOT, of Paris, in the French Empire, physician, have invented "Toilet, Anhydrous, Illustrated, Rectified, Double-Faced Soaps;" and I do hereby declare that the following is a full, clear, and exact description of the same.

My invention consists, first, in preparing anhydrous rectified soaps; second, in illustrating such thus prepared soaps; third, in superposing on one single cake intended for bodily use two layers of different nature, fragrance, and hue, (double-faced soaps.)

My anhydrous soaps are prepared as follows: Reducing the mass into slivers or ribbons, which are carried on to the stove room, where they remain till complete desiccation, pulverizing them as finely as possible, moistening them with sufficient quantity of pulverized perfumed alcohol, submitting the whole to a strong compression, so as to reaggregate it into a ball, cutting out or drawing the same into bungs and beating them. These anhydrous products contain proportionately a larger, much larger, amount of soap than other soaps. They are more soluble in water, more frothy, and yet less rapidly consumed. Being deprived of water they cannot be contracted from desiccation, and preserve indefinitely and without deformation the shapes given to them, and can exclusively assume the configuration of the double-faces, as alluded to.

I prepare the rectified soap as follows: This method of previously desiccating soap has this effect, that it deprives it partly of the excess of soda, and frequently suffices to eliminate the alkali contained therein. However, in most and the best manufactured soaps there yet remains soda in too great quantity for the alkali not attacking the epidermis by causing a glow of the skin. To remove this excess it is necessary to proceed as for anhydrous soaps, or add under the crusher a sufficient amount of finely-pulverized colophony. After five or six crushings, and about seventy-two hours of drying in the stove room, the whole soda at liberty has formed with the pulverized colophony a rosin soap, which singularly increases the unctuous and frothy qualities of the primitive mass.

To illustrate my toilet soaps I proceed as follows: The illustration may be either a lineal deep furrow made in the cake by means of a thin metallic blade, or otherwise, in which furrow I introduce a colored liquid, so as to reproduce the figure after the cake has been beaten; or, by incrustating diversely-colored perfumed and figured soaps thereinto; or, by both combined processes; or, by associating variously-colored soaps drawn through a suitable gauge-plate. The incrustation is obtained by any suitable means. The furrow or lodging is hollowed out into the cake by any cutting punch of suitable form. If the incrustation whereby the lodging is to be occupied, or if even should there be desired different colorations, this soap can be formed of a single block. I place a disk of suitable thickness over the lodging, and the punch, on entering, will drive before it part of said disk, so as to fill up snugly the prepared groove or lodging. Should, on the contrary, the soaps to be incrustated or ornamented represent complicated designs, both in colors and shape, not allowing the composition of the block, the said disk thereof is to be detached from it. Then the incrustation is made by hand or mechanically, as a mosaic, for instance, by juxtaposing the various parts of the design, which are as many a fragment, cut out by the punch, or shaped by their being drawn through a suitable draw-plate. The whole being thus proceeded with, as described, the incrustated cake is carried to a powerful beating press. The incrustation may traverse the cake all through, so as to reproduce the design on both sides, although I prefer its penetrating the half part only, so that the design may appear till the complete wear of the cake, and that the peculiar perfume to each illustrated part may be perceived likewise and singly up to the end. This peculiarity of perceiving singly and separately the most different perfumes in a soap cake, and chiefly that of uniting in the same the most various specimens, from pumice soap to the most unctuous ones, the most and least neutral soaps, as I have made an application in my double-faced soap, known in trade by the name of St. Louis soap; these advantages, I repeat it, are the reason of my manufacturing double-faced soaps, the process for the fabrication of which I will summarily describe. This fabrication is the same as for anhydrous soaps, care being taken only to place very regularly in the mould bottom of a hydraulic press made for the purpose two superposed layers of a powder of the various soaps suitably alcoholized. Under a powerful pressure the aggregation of such powders is effected; the ball or mass resulting therefrom is cut out, and the pieces or fragments thereof are beaten, as above specified.

I am well aware that anhydrous soaps have been manufactured, but not like those of my own fabrication, viz, by producing in a sole and same piece soaps of various natures for various uses, for instance, pumice soap on one side and common unctuous soap on the other, illustrated soaps by introduction, incrustation of variously-variegated pieces or slivers into one another, and within one same cake or block.

*Claim.*

Manufacturing the above-described soaps, which go by the names of anhydrous rectified soaps, illustrated soaps, double-faced soaps, obtained by one same process, that is to say, with anhydrous soap, which alone allows of the fabrication of a block or cake composed of parts of different nature, colors, and perfumes, united together in the manner of mosaic work, as and for the purposes described, viz, having in one and same block or piece heterogeneal soaps, made to answer various purposes, or variously illustrated and perfumed soaps, substantially as described.

MOUGEOT.

Witnesses:
 FLOURTALEUX,
 DEMOS.